United States Patent [19]
Feng

[11] Patent Number: 5,161,420
[45] Date of Patent: Nov. 10, 1992

[54] CAM MECHANISM FOR CONVERTING ROTARY MOTION TO OSCILLATING MOTION

[75] Inventor: I-Pin Feng, Taipei, Taiwan
[73] Assignee: Jack Hou, Taipei, Taiwan
[21] Appl. No.: 778,284
[22] Filed: Oct. 17, 1991

Related U.S. Application Data

[63] Continuation-in-part of Ser. No. 487,275, Mar. 2, 1990, abandoned.

[51] Int. Cl.⁵ .................... F16H 25/14; F16H 53/02; G01F 1/06
[52] U.S. Cl. ........................... 74/53; 74/567; 84/95.2
[58] Field of Search ............... 74/53, 567; 272/31 R; 446/352; 84/94.1, 95.1, 95.2

[56] References Cited

U.S. PATENT DOCUMENTS

| | | | |
|---|---|---|---|
| 14,186 | 2/1856 | Dickerson et al. | 74/567 X |
| 214,115 | 4/1879 | Wolfe | 74/53 X |
| 236,144 | 1/1881 | Clark | 74/53 |
| 547,860 | 10/1895 | Paige | 74/53 X |
| 629,039 | 7/1899 | Luitwieler | 74/567 X |
| 1,543,066 | 6/1925 | Eberling | 74/53 X |
| 2,070,633 | 2/1937 | Topham | 74/53 |
| 2,489,882 | 11/1949 | Hartley | 74/53 |
| 3,261,553 | 7/1966 | Kooi et al. | 74/54 X |
| 3,413,862 | 12/1968 | Waara | 74/53 |
| 3,786,596 | 1/1974 | Breslow et al. | 446/271 |
| 4,804,348 | 2/1989 | Bondi | 446/83 |
| 4,890,828 | 1/1990 | Hou | 446/238 X |
| 4,939,944 | 7/1990 | Hou | 74/49 |
| 5,020,409 | 6/1991 | Hou | 84/95.2 |
| 5,070,753 | 12/1991 | Hou | 84/95.2 |

FOREIGN PATENT DOCUMENTS

| | | | |
|---|---|---|---|
| 1181073 | 6/1959 | France | 74/53 |
| 56-134138 | 10/1981 | Japan | 74/53 |

*Primary Examiner*—Leslie A. Braun
*Assistant Examiner*—Julie Krolikowski
*Attorney, Agent, or Firm*—Bacon & Thomas

[57] ABSTRACT

A cam mechanism that converts unidirectional rotary motion into substantially uniform oscillating motion is disclosed. The mechanism includes a cam having a cam surface of generally cardioid configuration having a first point of minimum distance from a rotational axis and a second point of maximum distance from the rotational axis such that an angle measured from a first line connecting the axis and the first point to a second line connecting the axis and the second point is less than 180° measured in the direction of cam rotation. The cam may be driven from a power source having unidirectional rotary motion, such as the output shaft of a music box mechanism. A crank or rocker arm may be pivotally attached to oscillate about an oscillating axis and have a cam follower associated with the cam such that rotary motion of the cam causes the crank or rocker arm to oscillate about its oscillating axis.

29 Claims, 7 Drawing Sheets

CAM MECHANISM FOR CONVERTING ROTARY MOTION TO OSCILLATING MOTION

RELATED APPLICATIONS

This patent application is a Continuation-in-Part of U.S. Ser. No. 07/487,275 filed on Mar. 2, 1990, now abandoned.

BACKGROUND OF THE INVENTION

The present invention relates to a cam mechanism for converting rotary motion into oscillating or reciprocating motion, more particularly such a mechanism used in an animated ornamental device. The invention finds particular usage for imparting an oscillating or reciprocating movement to an ornamental object from the output of a power drive source, which may be a music box mechanism.

It is well known in the art to impart oscillating or reciprocating movement to ornamental objects, such as dolls, toys, etc., which may be supported on a housing and powered by a windup or an electric music producing mechanism. This is typically achieved by providing the power output shaft with a cam or a linkage mechanism connected to the ornamental object. Usually a tappet rod supporting the ornamental object, is journalled through the wall of a housing enclosing the mechanism and is actuated by the cam or linkage mechanism. If a cam element is used, it is typically slidably disposed within a slot provided in a follower arm, so that rotation of the cam by the output shaft imparts an oscillating movement to the tappet rod which, in turn, causes corresponding oscillation of the ornamental object.

The conventional oscillating mechanism of this type is based upon the concept of a sliding block disposed within a sliding groove and may also be known as a rocker arm, reciprocating mechanism.

While such a mechanism is relatively simple, it is inherently incapable of providing a uniform and balanced oscillating movement to the ornamental object. This is due to the geometric relationship between the cam follower arm and the associated cam which describes two arcuate paths traveled by the cam element. The beginning and the end of the paths are defined by radii extending outwardly from the cam assembly axis of rotation which intersect the cam element at two points establishing the extreme limits of the oscillation. Since the cam element must travel along a longer arcuate path during the forward half of the oscillation movement than the arcuate path required for completing the return half of the movement, it is readily apparent that each half of the oscillation motion is completed over a different time interval, and, consequently, at a different speed. The use of the known mechanism results in a non-uniform oscillation of the ornamental object.

SUMMARY OF THE INVENTION

The present invention relates to a cam mechanism that converts unidirectional rotary motion into substantially uniform oscillating or reciprocating motion.

The mechanism includes a cam having a cam surface of generally cardiod configuration having a first point of minimum distance from a rotational axis and a second point of maximum distance from the rotational axis such that an angle measured from a first line connecting the axis and the first point to a second line connecting the axis and the second point is less than 180° measured in the direction of cam rotation.

The cam may be driven from a power source having a undirectional rotary motion, such as the output shaft of a music box mechanism. A crank or rocker arm may be pivotally attached to oscillate about an oscillating axis and have a cam follower associated with the cam such that rotary motion of the cam causes the crank or rocker arm to oscillate about its oscillating axis. The ends of the crank or rocker arm may be associated with a follower constrained so as to undergo only translational motion. A rod supporting the ornamental object and extending to the exterior of an enclosure may be driven by the follower such that it undergoes oscillating translation at a substantially uniform and balanced speed.

Alternatively, the rod may have a cam follower extending therefrom in contact with the cam surface. A guide element associated with the rod guides the rod along a linear path of travel as rotation of the cam causes reciprocation of the rod at substantially uniform speed.

DETAILED DESCRIPTION OF THE PREFERRED EMBODIMENT

Although the mechanism according to the invention will be described in conjunction with an oscillating or reciprocating ornamental device, it is to be understood that the principals elucidated herein are applicable to any device requiring oscillating or reciprocating motion.

Figure 1:
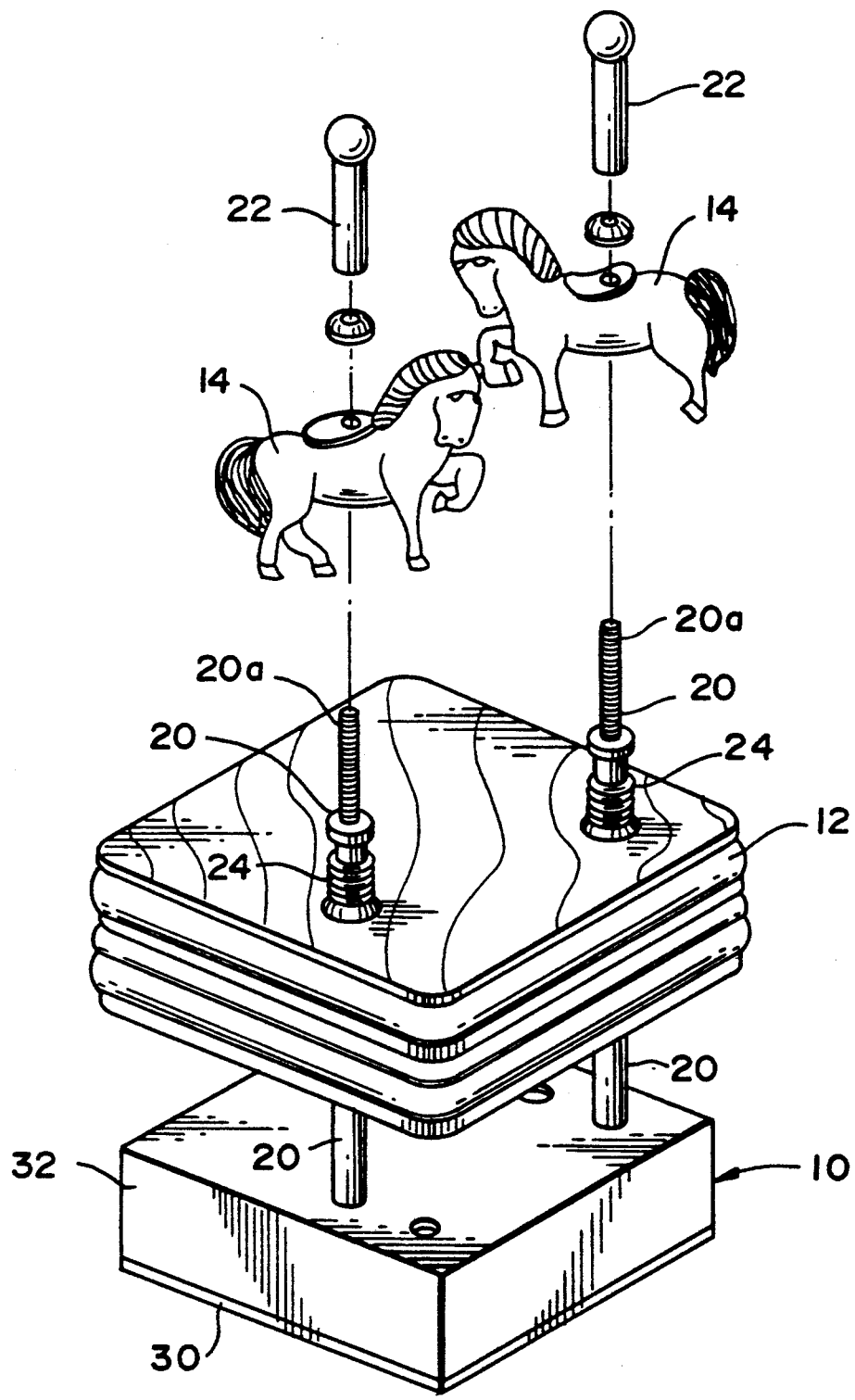
FIG. 1 is an exploded, perspective view of an ornamental device incorporating a first embodiment of the mechanism according to the invention.
Figure 2:
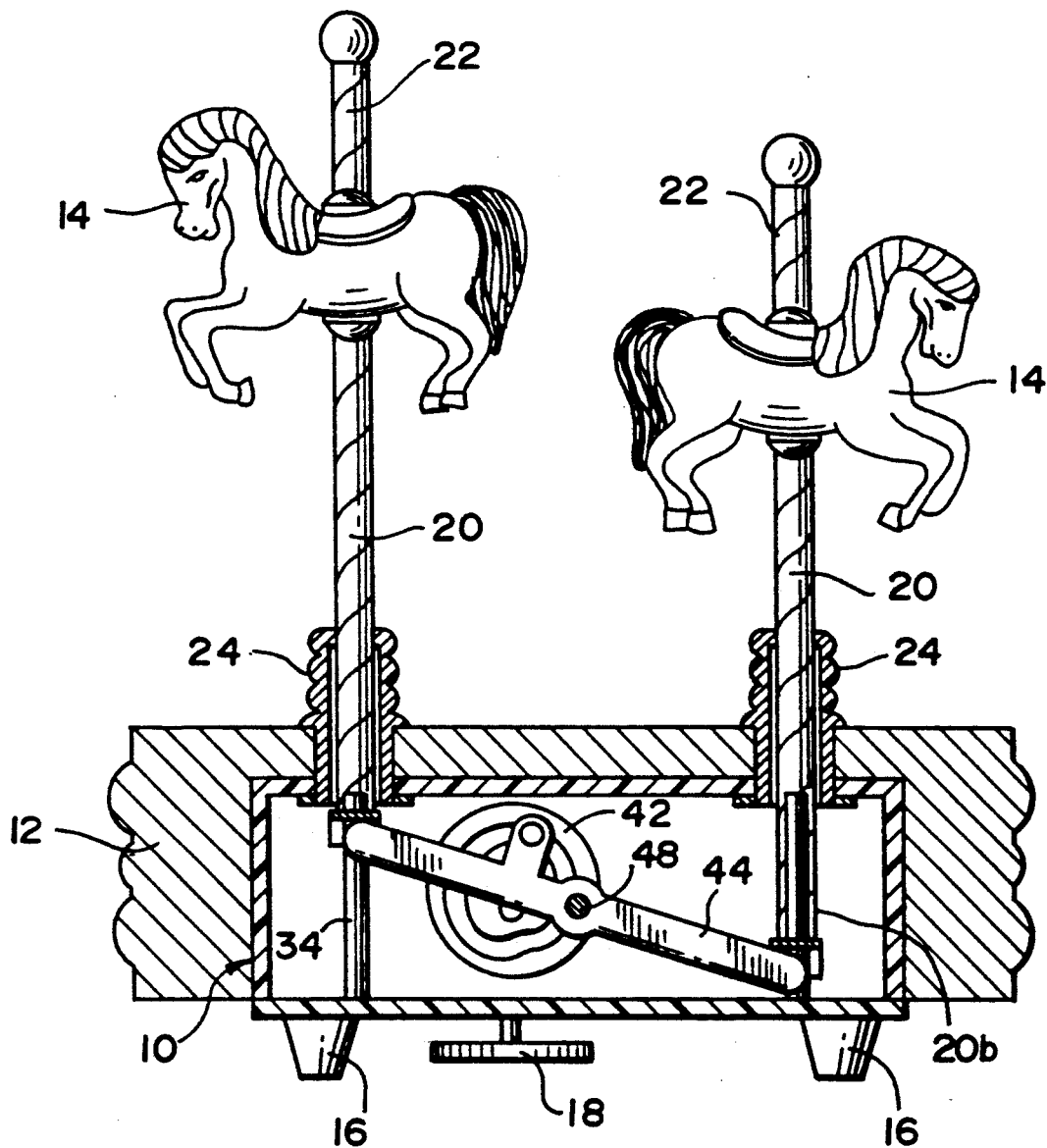
FIG. 2 is a side view, partially in section, of the ornamental device shown in FIG. 1.

As best seen in FIGS. 1 and 2, the ornamental device according to the invention comprises a housing 10 enclosing the drive mechanism, a base cover 12 mounted over the housing 10 to provide a decorative appearance and ornamental objects 14 (in this case ornamental horses) that reciprocates up and down with respect to the base cover 12. Base 10 may be provided with a plurality of feet 16 to support the decorative item on a surface (not shown) so as to provide clearance for a music box winding key 18.

Figure 3:
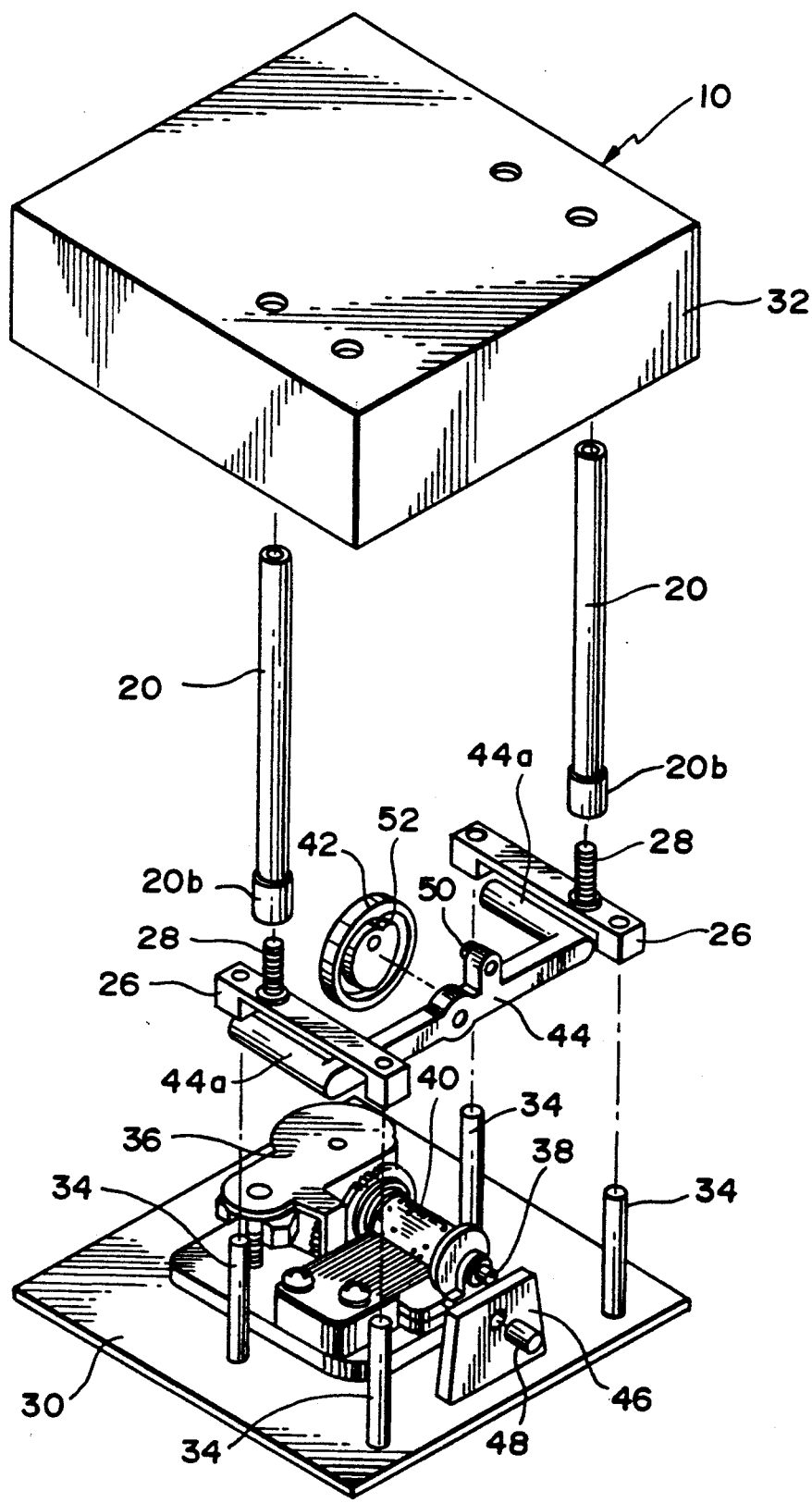
FIG. 3 is an exploded, perspective view showing the drive mechanism and housing of the ornamental device shown in FIGS. 1 and 2.

Ornamental objects 14 are fixedly attached to rods 20 by passing a threaded end portion 20a of each of the rods through the ornamental object 14 and securing same thereto by a correspondingly threaded cap 22. Rods 20 slidably extend through bushings 24 such that an end portion 20b is operatively associated with a follower 26 as illustrated in FIG. 3. The end 20b of rod 20 may be attached to the follower 26 via threaded engagement with attachment member 28.

The housing 10 comprises a base 30 and a cover 32 removably attached thereto by any known means. A plurality of guide posts 34 are fixedly attached to the base 30 and extend generally upwardly therefrom. Although four such guide posts are illustrated in FIG. 3, it is to be understood that more or less may be utilized without exceeding the scope of this invention.

Followers 26 are slidably mounted on the guide posts 34 so as to be capable of only undergoing translational movement in a generally vertical direction with respect to the base 30. Since followers 26 may undergo only translational movement, rods 20, as well as ornamental objects 14 are also constrained to only undergo translational movement in a generally vertical direction.

A power source, in this instance a music box mechanism 36, is also mounted on the base 30. The music box mechanism 36 is of a known type and, as is well known in the art, has a rotating output shaft 38 which rotates as the music drum 40 rotates.

A cam 42, to be described in more detail hereinafter, is attached to output shaft 38 so as to rotate therewith. A rocker arm 44 is pivotally attached to a rocker arm support 46 extending upwardly from the base 30, via a rocker arm pivot shaft 48. Rocker arm 44 has a cam follower 50 operatively associated therewith, a portion of which engages the cam surface 52 of cam 42 such that, when cam 42 rotates, rocker arm 44 oscillates about the axis of shaft 48.

As can be seen, oscillation of the rocker arm 44 about the axis of shaft 48 will cause the followers 26 to slide up and down on the guideposts 34, since each of the followers 26 are in contact with end portions 44a of the rocker arm 44. The shape of the cam surface 52 is such that the rocker arm 44 undergoes oscillation at a substantially uniform speed during the up and down movement of ends 44a. This imparts a uniform up and down movement to the ornamental objects 14.

Figure 4:
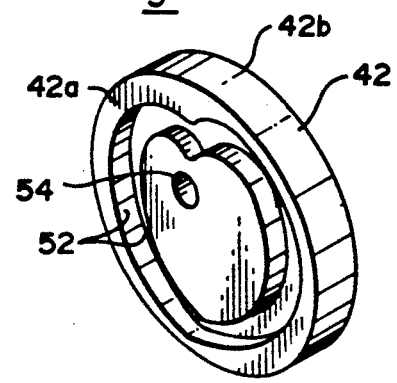
FIG. 4 is a perspective view of the cam according to the present invention.

The cam 42 is illustrated in FIG. 4 and comprises a cam body having opposite side faces 42a and 42b. A generally cardioid shaped cam surface 52 is defined in side face 42a. Opening 54 is attached to the output drive shaft 38 by any means which will cause the cam 42 to rotate with the shaft 38.

Figure 5:
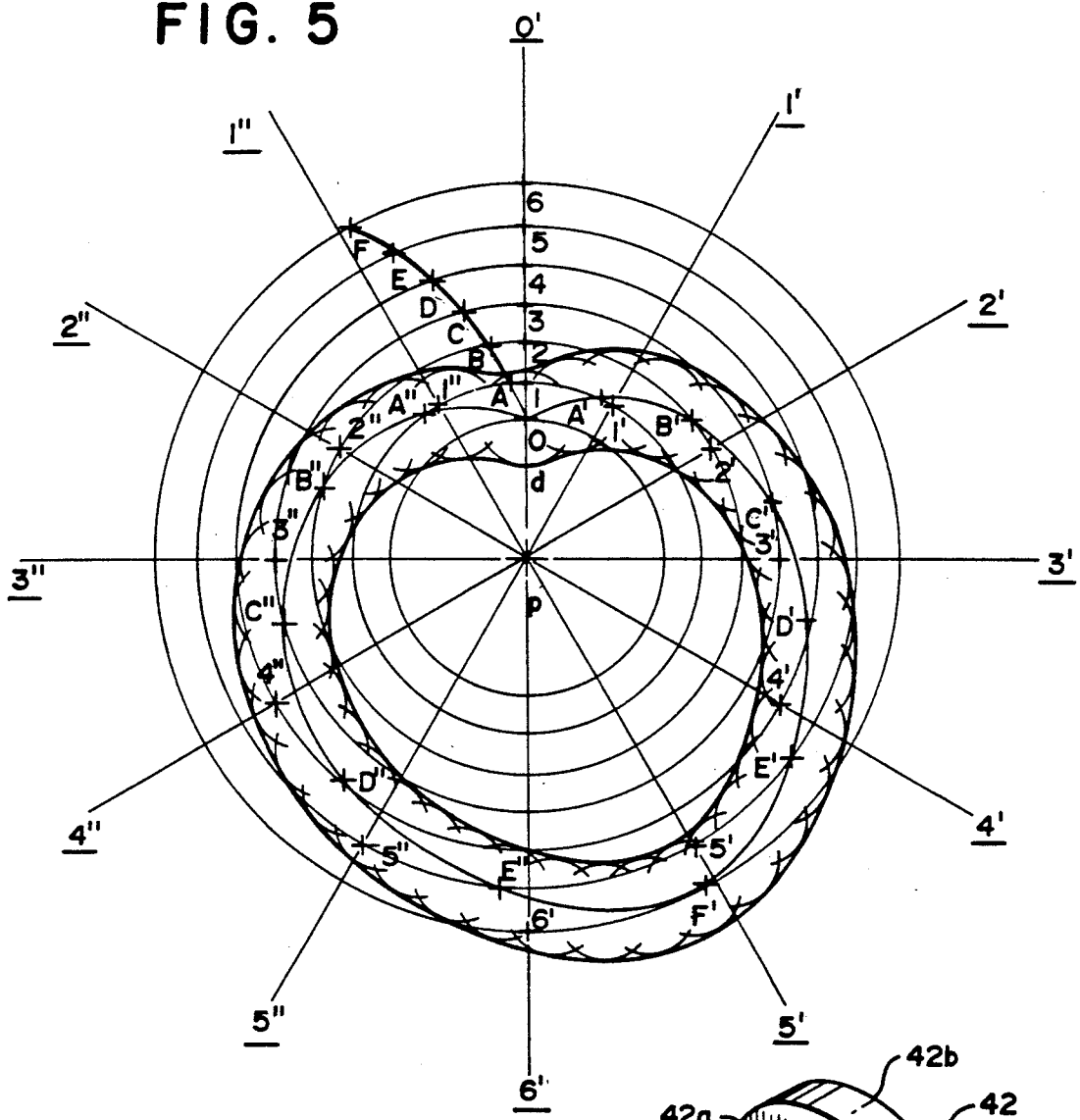
FIG. 5 is a schematic diagram illustrating the steps used in plotting the cam drive surface of the cam shown in FIG. 4.
Figure 6:
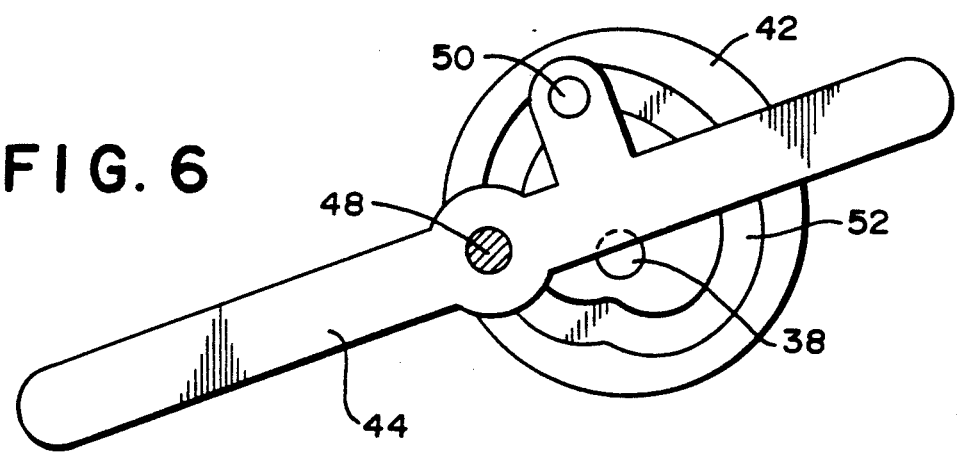
FIGS. 6 and 7 are side views of the cam and rocker arm according to the invention showing the two extreme positions of the rocker arm.
Figure 7:
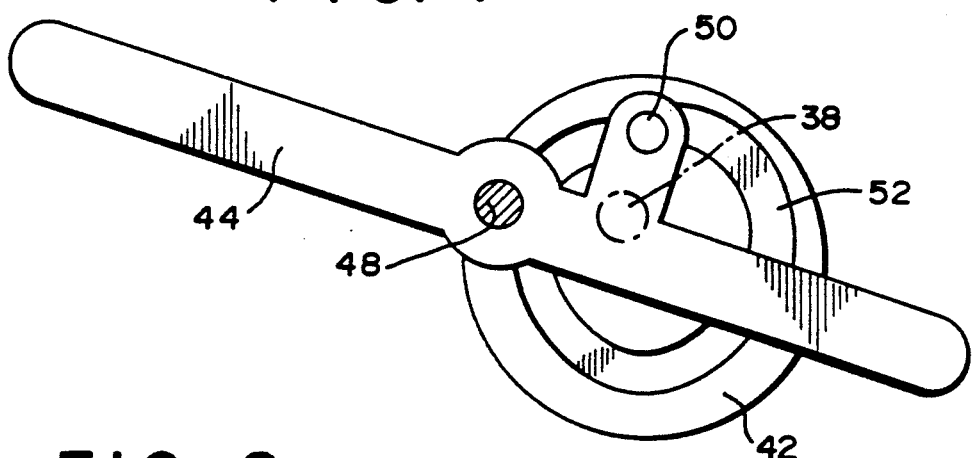
Figure 8:
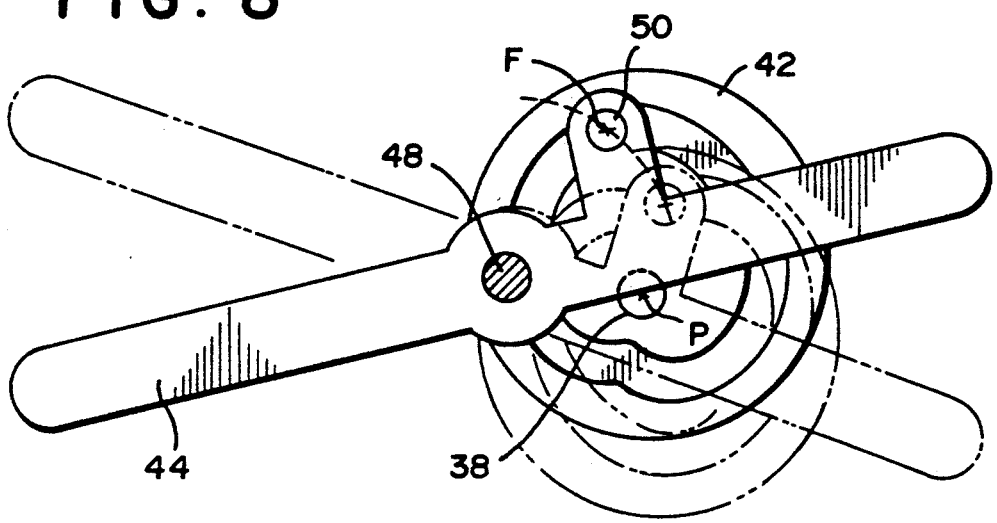
FIG. 8 is a side view of the cam and rocker arm similar to FIGS. 6 and 7 with the extreme positions of the rocker arm superimposed.

The method of determining the precise shape of the cam surface 52 will now be described with specific relation to FIGS. 5, 6, 7 and 8. FIGS. 6 and 7 show the two extreme positions of the rocker arm 44 and the associated positions of the cam 42. The positions of these elements have been superimposed upon one another in FIG. 8 with the positions of the elements shown in FIG. 6 represented by solid lines and the positions of FIG. 7 represented by dashed lines. The dimensions of the rocker arm 44 will be known, as will be the amount of vertical oscillating movement desired to be imparted to the ornamental objects 14. Also, the position of the cam follower 50 with respect to the rocker arm 44 will also be known and remain fixed. The relationship of these elements with respect to the output shaft 38 of the music box mechanism 36 will also be known. Given these known elements, the distance PO in FIG. 5 represents the distance between the center of the output shaft 38 (point P) and the lowermost point of travel (point O) of the cam follower 50. Cam follower 50 is constrained to follow an arcuate path having a center at shaft 48 between the points O and F, which define the limits of its travel. Path OF is a segment of a circle formed about the center of support shaft 48.

The known points P, O and F are plotted as indicated in FIG. 5. With point P as a center, a radius PO is drawn and the arcuate path OF is plotted. The curve OF is then subdivided into a plurality of equal sections, six such sections being shown in FIG. 5. It is to be understood, however, that a different number of such equal sections may be utilized without exceeding the scope of this invention. The equal sections are denoted by letters A, B, C, D, and E in FIG. 5.

Using point P as a center, circles are drawn passing through points O, A, B, C, D, E and F. The points at which these circles intersect the line PO', which is an extension of the radius PO, are denoted by points 0–6, respectively.

The circumference of the circles are then subdivided into twelve equal sections by radius lines P1', P2', P3', P4', P5', P6', P5", P4", P3", P2" and P1".

The point where radius line P1' intersects circle A is denoted as point 1'; the point where the radius line P2' intersects circle B is designated point 2'; the point where the radius line P3' intersects circle C is designated point 3'. Points 4', 5' and 6' are determined in the same fashion, respectively where the radius lines P4', P5' and P6' intersects circles D, E and F. Point 5" is determined by the intersection of radius line P5" with circle E; point 4" is the intersection of line P4" with circle D; point 3" is determined by the intersection of radius line P3" with circle C; point 2" is determined by the radius line P2" intersecting with circle B; and point 1" is determined by the intersection of radius line P1" with circle A.

The distance between point 1 and point A is determined and a corresponding distance on circle A is marked off from point 1' to determine the point A'. Similarly, the distance between point 2 and point B is marked off on circle B from point 2' to establish the point B'. The distance between point 3 and point C is marked off from point 3' on circle C to establish the point C'. In similar fashion, points D', E' and F' are established on circles D, E and F, respectively.

A distance corresponding to the distance between point 5 and point E is marked off on circle E from point 5" to establish the point E". A distance corresponding to the distance between point 4 and point D is marked off from point 4" on circle D to establish the point D". In similar fashion, points C", B" and A" are established on circles C, B and A, respectively.

Once these points have been established, a smooth curve is drawn from point O to interconnect this point with points A' through F' as well as points E" through A". This establishes the generally cardioid shape of the desired cam profile. Since the cross sectional dimension of the cam follower 50 is also known, the width of the cam groove on either side of the cam profile line can be established so as to slidably accommodate the cam follower.

From FIG. 5 is can be seen that the cam profile line has a point (Point 0) of minimum distance from the rotational axis of the cam (Point P) and a point (Point F') of maximum distance from the cam axis. The angle between a line connecting the axis and the minimum distance point (line PO) and a line connecting the axis and the maximum distance point (line PF'), measured in the direction of rotation (clockwise in FIGS. 5-8) is less than 180°.

Thus, it can be seen that a cam surface profile having a generally cardioid shape can be established that provides a smooth, substantially constant speed up and down motion to the ornamental articles.

Figure 9:
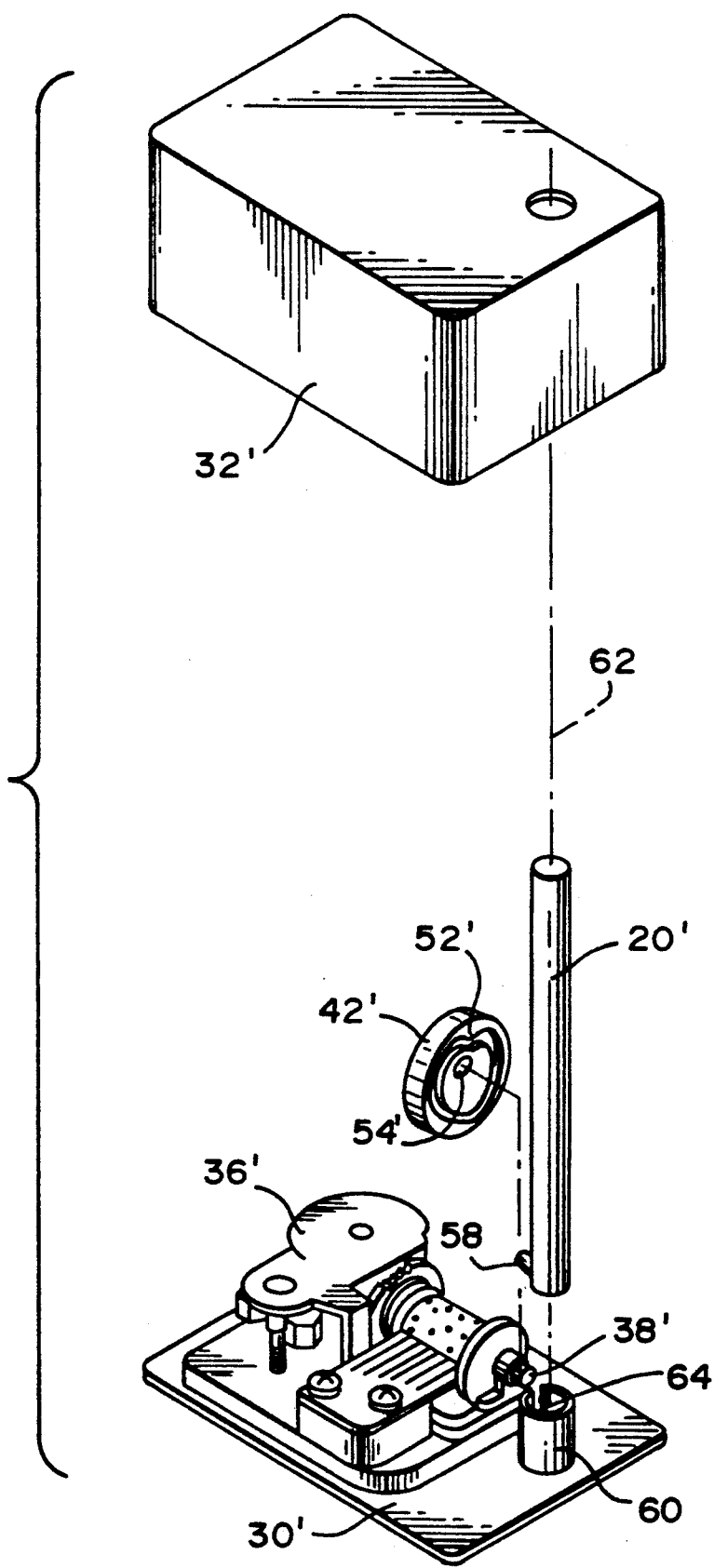
FIG. 9 is an exploded perspective view of a second embodiment of the mechanism according to the invention.
Figure 10:
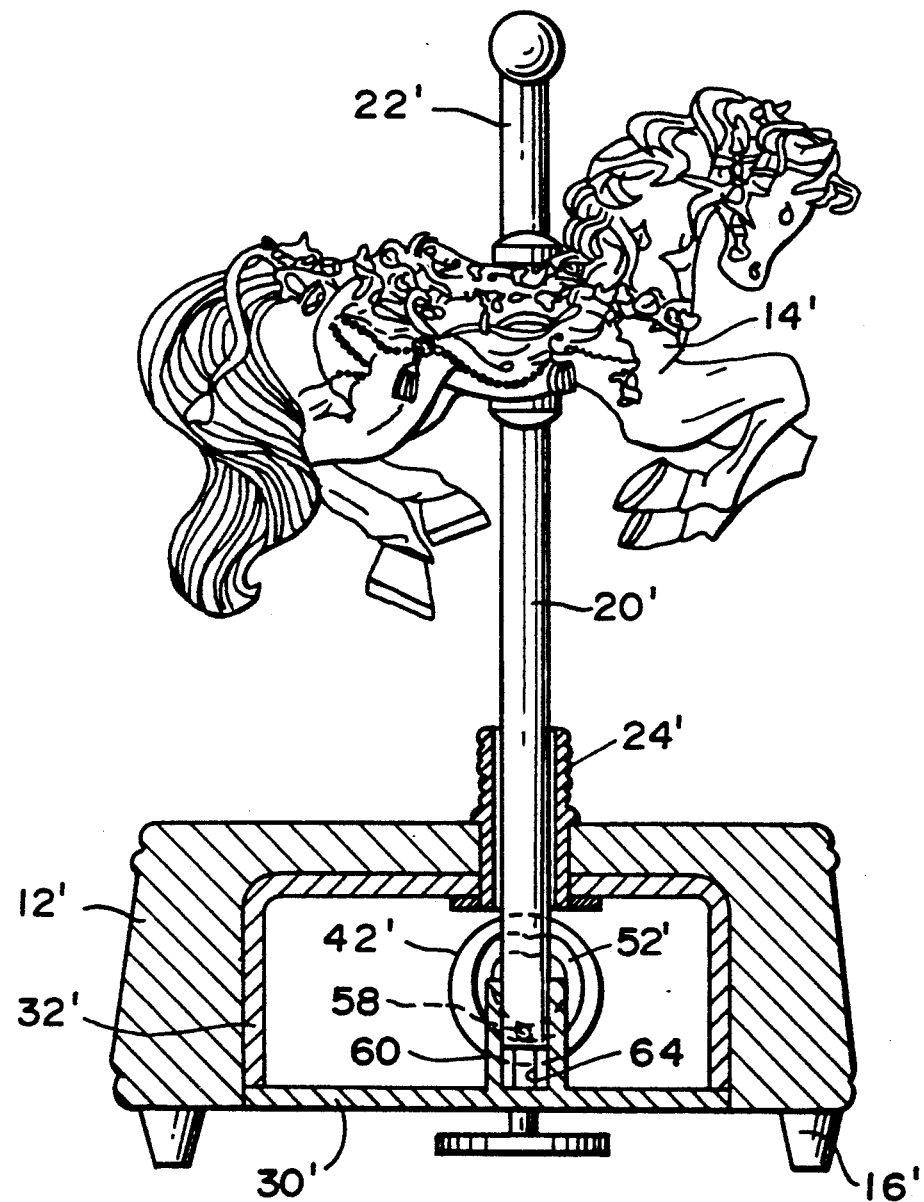
FIG. 10 is a side view, partially in cross-section, of the mechanism shown in FIG. 9.

A second embodiment of the invention is illustrated in FIGS. 9 and 10. Elements having a function similar to that in the previously described embodiment are identified by the same numerals with a prime added.

As can be seen, in this embodiment the rocker arm and its pivoting support have been pivoting support have been eliminated. The rod 20' has a cam follower 58 extending outwardly from a lower portion thereof and located such that it slidably engages the cam surface 52' of cam 42'. Cam surface 52' has the same cardoid-shaped configuration as in the previously described embodiment. Cam 42' is fixedly attached to the output shaft 38' of music box mechanism 36' so as to rotate therewith.

A guide element 60 extends upwardly from base 30' and has a generally hollow, cylindrical configuration so as to to slidably accept a portion of the generally cylindrical rod 20'. Rod 20' is slidably received within the guide element 60 so as to be constrained to move along a linear path coincident with the longitudinal axis 62 of the rod 20'.

Guide element 60 defines a slot 64 extending along one side thereof so as to slidably accommodate the cam follower 58 extending outwardly from rod 20'.

As can be seen, the cam follower 58 extends through slot 64 such that it slidably contacts the cam surface 52'. As cam 42' rotates, the interaction of the cam slot 52' and the cam follower 58 causes reciprocating movement of rod 20' along its longitudinal axis 62. Due to the configuration of the cam, such reciprocating movement is substantially uniform in speed in both directions. This imparts uniform reciprocating movement to decorative ornament 14' attached to the rod 20' by threaded cap member 22'.

The foregoing is provided for illustrative purposes only and should not be construed as in any way limiting this invention, the scope of which is defined solely by the appended claims.

I claim:

1. A mechanism for oscillating a pivot shaft in opposite directions at substantially uniform speed about a longitudinal axis comprising:
    a) a music box including a rotating output shaft;
    b) a single cam operatively connected to the output shaft so as to rotate about a rotational axis, the cam comprising a cam body having a cam surface of generally cardioid shape having a first point of minimum distance from the rotational axis and a second point of maximum distance from the rotational axis such that an angle measured from a line connecting the axis and the first point to a line connecting the axis and the second point is less than 180° measured in the direction of rotation of the cam body;
    c) a rocker arm operatively connected to the pivot shaft; and,
    d) cam follower means associated with the rocker arm and engaging the cam surface such that rotation of the cam causes substantially uniform speed oscillation of the pivot shaft in both directions.

2. The mechanism according to claim 1 wherein the cam body is generally planar having opposite faces and wherein the cam surface is defined by a groove formed in one of the faces.

3. The mechanism according to claim 1 wherein the rotational axis of the cam is generally parallel to the longitudinal axis of the drive shaft.

4. A mechanism for oscillating a rocker arm in opposite directions at a substantially uniform speed comprising:
    a) a music box including a rotating output shaft;
    b) a single cam operatively connected to the output shaft so as to rotate about a rotational axis, the cam comprising a cam body having a cam surface of generally cardioid shape having a first point of minimum distance from the rotational axis and a second point of maximum distance from the rotational axis such that an angle measured from a line connecting the axis and the first point to a line connecting the axis and the second point is less than 180° measured in the direction of rotation of the cam body;
    c) a rocker arm;
    d) means pivotally supporting the rocker arm such that the arm may oscillate in opposite directions about a pivot axis;
    e) cam follower means operatively associated with the rocker arm and engaging the cam surface such that rotation of the cam causes the rocker arm to oscillate about the pivot axis at a substantially uniform speed in both directions;
    f) a rod; and,
    g) a follower member attached to the rod and operatively associated with the rocker arm such that uniform movement of the rocker arm causes uniform movement of the rod.

5. The mechanism according to claim 4 wherein the cam body is generally planar having opposite faces and wherein the cam surface is defined by a groove formed in one of the faces.

6. The mechanism according to claim 4 wherein the rotational axis of the cam is generally parallel to the pivot axis of the rocker arm.

7. The mechanism according to claim 4 further comprising:
    a base to which the music box and the means pivotally supporting the rocker arm are attached.

8. The mechanism according to claim 7 further comprising guide means associated with the rod such that the rod undergoes only translational movement at substantially uniform speed.

9. The mechanism according to claim 8 wherein the guide means comprises:
    guide post means extending from the base operatively associated with the follower member such that it slides along the guide post means.

10. The mechanism according to claim 9 further comprising a cover located on the base so as to enclose the music box, the cam, the rocker arm, the cam follower means, the guide post and the follower member, the cover defining an opening to allow at least a portion of the rod to extend therethrough to an exterior of the cover.

11. The mechanism according to claim 10 further comprising a decorative article attached to the rod exteriorly of the cover so as to translate with the rod at substantially uniform speed.

12. The mechanism according to claim 11 wherein the cam body is generally planar having opposite faces and wherein the cam surface is defined by a groove formed in one of the faces.

13. The mechanism according to claim 12 wherein the rotational axis of the cam is generally parallel to the pivot axis of the rocker arm.

14. The mechanism according to claim 4 wherein the rocker arm has end portions extending from opposite sides of the pivot axis.

15. The mechanism according to claim 14 further comprising:
 a) a base to which the music box and the means pivotally supporting the rocker arm are attached; and,
 b) a rod operatively associated with each end portion of the rocker arm such that oscillating movement of the rocker arm causes movement of the rods.

16. The mechanism according to claim 15 further comprising guide means operatively associated with each rod such that each rod undergoes only translational movement at substantially uniform speed.

17. The mechanism according to claim 16 wherein each guide means comprises:
 guide post means extending from the base operatively associated with the follower member such that it slides along the guide post means.

18. The mechanism according to claim 17 further comprising a cover located on the base so as to enclose the music box, the cam, the rocker arm, the cam follower means, the guide post and the follower member, the cover defining an opening to allow at least a portion of the rod to extend therethrough to an exterior of the cover.

19. The mechanism according to claim 18 further comprising a decorative article attached to each of the rods exteriorly of the cover so as to translate with the rods at substantially uniform speed.

20. The mechanism according to claim 19 wherein the cam body is generally planar having opposite faces and wherein the cam surface is defined by a groove formed in one of the faces.

21. The mechanism according to claim 20 wherein the rotational axis of the cam is generally parallel to the pivot axis of the rocker arm.

22. A mechanism for imparting uniform reciprocating movement in opposite directions to an ornamental object comprising:
 a) a music box including a rotatable output shaft;
 b) a cam operatively connected to the output shaft so as to rotate about a rotational axis, the cam comprising a cam body having a cam surface of generally cardoid shape having a first point of minimum distance from the rotational axis and a second point of maximum distance from the rotational axis such that an angle measured from a line connecting the axis and the first point to a line connecting the axis and the second point is less than 180° measured in the direction of rotation of the cam body;
 c) a rod operatively associated with an ornamental object;
 d) guide means operatively associated with the rod such that the rod is constrained to move in opposite directions along a linear path of travel; and,
 e) a cam follower operatively associated with the rod and the cam surface such that rotation of the cam causes reciprocation of the rod at a substantially uniform speed in both directions along its linear path of travel.

23. The mechanism of claim 22 wherein the guide means comprises a stationary guide element in sliding contact with the rod.

24. The mechanism of claim 23 wherein the guide element has a hollow, substantially cylindrical configuration and slidably contacts a portion of an exterior surface of the rod.

25. The mechanism of claim 24 wherein the cam follower extends from the rod and slidably contacts the cam surface.

26. The mechanism of claim 25 further comprising a slot defined by the substantially cylindrical guide element and located so as to allow the cam follower to extend through the slot.

27. The mechanism of claim 23 further comprising a base to which the music box and the stationary guide element are attached.

28. The mechanism of claim 27 further comprising a cover located on the base so as to enclose the music box and the guide element, the cover defining an opening to allow at least a portion of the rod to extend therethrough to an exterior of the cover.

29. The mechanism of claim 22 wherein the cam body is generally planar having opposite faces and wherein the cam surface is defined by a groove defined by one of the faces.

* * * * *